United States Patent Office 3,498,912
Patented Mar. 3, 1970

3,498,912
PROCESS FOR THE CLARIFICATION OF WASTE EFFLUENTS
David L. Kieper and Stephen S. Treichel, Minneapolis, Minn., assignors to General Mills, Inc., a corporation of Delaware
No Drawing. Filed July 10, 1967, Ser. No. 651,990
Int. Cl. C02b 1/20
U.S. Cl. 210—49      5 Claims

ABSTRACT OF THE DISCLOSURE

A process for the removal of suspended solids and the reduction of the biological oxygen demand of waste effluents such as raw sewage or industrial effluents by treatment of the sewage with a cationic derivative of a polygalactomannan gum in combination with a polyvalent metal cation.

---

The invention relates to the treatment of raw sewage or industrial effluents with a combination of a cationic derivative of a polygalactomannan gum and a polyvalent metal ion for the purpose of removing suspended solids and reducing the biological oxygen demand of the sewage.

Various attempts to reduce the suspended solids and the biological oxygen demand of raw sewage have been tried and they have not met with complete success. By means of the present invention, it is possible to achieve a very high level of removal of suspended solids, up to 90 to 95% of the suspended solids, and to reduce the biological oxygen demand by up to 50%.

It is therefore an object of the present invention to provide a process for the treatment of raw sewage to remove suspended solids and to reduce the biological oxygen demand.

As indicated above, the process involves the use of a combination of reagents. The cationic derivative of the polygalactomannan gum may be any of a number of derivatives. The polygalactomannan gums are well known and commercially available. The most common of these are guar gum and locust bean gum which are particularly useful in the present invention. The preferred derivatives of these gums are amino and the quaternary ammonium derivatives made by reacting the gum with reactive amine compounds or reactive quaternary ammonium compounds. A particularly desirable group of cationic derivatives of polygalactomannan gums are those disclosed in the copending application of Robert Nordgren, Ser. No. 442,504, filed Mar. 24, 1965, now abandoned. According to that application, the cationic derivatives are made by reacting the polygalactomannan gum with a quaternary ammonium compound and the preferred quaternary ammonium compounds for this purpose are those defined by the following formula:

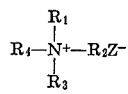

where $R_1$, $R_2$ and $R_3$ are from the group consisting of alkyl, substituted alkyl, alkene, aryl, and aralkyl groups, $Z^-$ is an anion and $R_4$ is selected from the group consisting of epoxyalkyl and halohydrin groups.

Illustrative of the anion $Z^-$ are $Cl^-$, $Br^-$, $I^-$ and $HSO_4^-$. The group $R_4$ may be further illustrated by the formulae below:

(1) 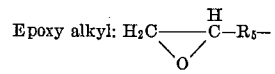

(2) 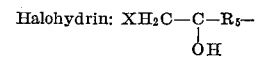

where X is a halogen atom and $R_5$ is a divalent alkylene radical having from 1 to 3 carbon atoms. The radical may be straight chained or branched chain. Illustrative thereof are

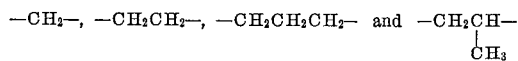

If all $R_1$, $R_2$ and $R_3$ are the same, they each should preferably contain not more than 4 carbon atoms. If all three $R_1$, $R_2$ and $R_3$ are not the same and if $R_3$ contains up to 18 carbon atoms, then $R_1$ and $R_2$ should preferably be from the group of methyl and ethyl. If $R_1$ and $R_2$ are joined to form a ring, then $R_3$ should preferably be from the group of methyl and ethyl. Thus, the total number of carbon atoms in $R_1$, $R_2$ and $R_3$ should preferably not exceed 22 carbon atoms and may contain as low as 3 carbon atoms.

Quaternary ammonium compounds of the type which may be employed are commercially available. Illustrative of these commercially available compounds are 2,3-epoxypropyl trimethylammonium chloride and 3-chloro-2-hydroxypropyl trimethylammonium chloride. The quaternary ammonium compounds may be prepared by reacting a tertiary amine or tertiary amine salt with an epihalohydrin. Tertiary amines having the groups $R_1$, $R_2$ and $R_3$ defined above may be employed. The epihalohydrin employed is one providing the group $R_4$ defined above. If a tertiary amine is employed, $R_4$ is an epoxyalkyl group. If a tertiary amine salt is employed, $R_4$ is a halohydrin group as defined above. Illustrative tertiary amine salts are the salts prepared by treating a tertiary amine with hydrochloric acid, sulfuric acid or phosphoric acid.

The preferred tertiary amines are those possessing at least two methyl groups ($R_1$ and $R_2$) attached directly to the nitrogen atom because of their greater reactivity which is maintained even when the third group ($R_3$) contains 18 carbon atoms as in dimethylstearyl amine. Other tertiary amines which may be employed are dimethylbenzene, dimethyldodecyl, dimethyldecyl, diethylstearyl, diethyldodecyl, diethylbenzene amine, triethylamine, tripropylamine, tributylamine, N-ethyl and N-methyl morpholine, N-ethyl and N-methyl piperidine and methyl diallylamine.

To prepare the quaternary ammonium compounds, the reagents may be prepared by simply mixing equimolar quantities of the epichlorohydrin and tertiary amine (or the salt thereof) in an aqueous system and allowing the reaction to proceed preferably with agitation until formation of the product is complete. When employing the salts, best results are obtained if the pH of the aqueous system is above 8 and preferably between 9 and 10. The resultant addition product is then recovered by vacuum distillation of the unreacted epihalohydrin and amine.

For illustration, the reaction of epichlorohydrin and trimethylamine and also of epichlorohydrin and trimethylamine-hydrochloride may be shown by the following equations:

(1)

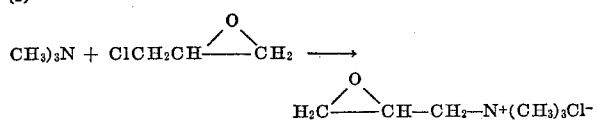

and (2)

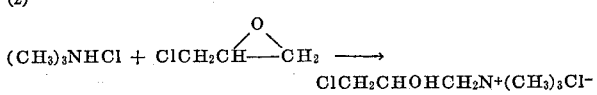

In order to prepare the quaternary ammonium gum ethers of this invention, the above described quaternary ammonium compounds may be dissolved in a suitable solvent such as water, dioxane or an alcohol and the gum added thereto. Any inert solvent may be employed. Among the suitable alcohols are isopropanol, methanol, ethanol and tertiary butanol. A strongly alkaline catalyst is generally employed to promote the reaction. The reaction occurs at room temperature; however, heat and increased amounts of catalyst increase the reaction rate. In general, temperature of at least 30° C. up to 60° C. may be employed. The catalyst when employed is preferably not employed in excess of 0.1 mole. Illustrative of the catalysts which are preferably employed are the alkali metal hydroxides, alkaline earth hydroxides and quaternary ammonium bases. Illustrative thereof are sodium hydroxide, lithium hydroxide, potassium hydroxide, calcium hydroxide, ammonium hydroxide and benzyltrimethylammonium hydroxide. After the etherification reaction, the catalyst may be left in the reaction product or neutralized with any suitable acid such as acetic or hydrochloric.

The quaternary ammonium compound or other cationic reagent is preferably employed in an amount of from 0.02 to 0.1 mole per molar weight of anyhydroglucose unit; however, amounts from 0.01 to 0.2 mole are also useful. By varying the amount of the cationic reagent, varying degrees of substitution (D.S.) are provided. For the purposes of the present invention, a D.S. in the range of 0.05 to 0.5 is suitable in most instances. Higher D.S.'s may be employed but generally are more difficult to achieve and accordingly are not preferred. Other cationic gum derivatives which may be used include the ethers obtained by reacting polygalactomannans with 2-chloroethyl amine (ClCH$_2$(H$_2$NH$_2$)) or 2-chlorethyl diethylamine [ClCH$_2$CH$_2$N(C$_2$H$_5$)$_2$].

The other reagent employed for treatment of the raw sewage is a compound which contains a polyvalent metal ion such as iron (ferrous or ferric) or aluminum. Typical compounds which may be used are ferrous chloride, ferrous sulphate, ferric chloride, ferric sulphate, aluminum sulphate.

The treatment of the sewage with the reagents is relatively simple. The polyvalent metal compound is added first, preferably, in order to effect charge neutralization and begin coagulation of the suspended particles. This may increase the efficiency of the cationic polygalactomannan derivative to coagulate and flocculate the particles. Accordingly, the polygalactomannan gum derivative is added second for efficiency purposes. However, both reagents may be added simultaneously. The reagents are preferably added to the raw sewage in the form of aqueous solutions. The sewage is agitated after the addition of the polyvalent metal compound and thereafter the cationic polygalactomannan gum derivative is added and the agitation continued for a suitable period of time to thoroughly distribute the gum derivative. Thereafter the agitation is continued but at a lower speed to permit the particles to flocculate and increase in size. Following the thorough dispersion of the reagents, the sewage is passed to a settler and the solid material allowed to settle out.

The quantity of the respective reagents to be added will vary widely depending upon the particular sewage being treated and depending upon the geographical area. The nature of the sewage may change from time to time and, accordingly, the quantity of the respective agents may be varied accordingly. In view of these differences in the composition of sewage and the changes in the composition from time to time, it is not possible to specify accurately the relative amounts of the reagents which may be employed in each instance. However, in general, the polyvalent metal compound is employed in a larger quantity than the gum derivative. In most instances, the polyvalent metal compound will be employed in the range of 5 to 100 parts per million and the gum derivative in the range of 0.25 to 10 parts per million based on the weight of the sewage. The optimum quantity which may be used under any particular circumstances can readily be determined by those skilled in the art.

EXAMPLE 1

In this example, raw sewage was treated in the laboratory in order to determine the effectiveness of the treatment. In these examples, battery jars were filled with 2 liters of raw sewage. Rotatable paddles extending into the jars were capable of agitating the sewage at the desired rates and for the desired times. The paddles were started at 99 r.p.m. and the polyvalent metal compound and the gum derivative was added in that order and the paddles rotated at 99 r.p.m. for 2 minutes and were then slowed to 20 r.p.m. for 15 minutes. The paddles were then removed and the sewage allowed to settle for 30 minutes. The following table illustrates the effect of the treatment. For comparison purposes, the effect of the mechanical treatment above is also reported.

TABLE 1

|  | Suspended solid | BOD |
|---|---|---|
| Test No. 1: | | |
| Raw Sewage | 305 | 244 |
| Effluent after mixing, flocculating and settling | 56 | 143 |
| Effluent after treatment 10.0 p.p.m. FeCl$_3$, 1.5 p.p.m. Guar A) | 25 | 116 |
| Test No. 2: | | |
| Raw Sewage | 181 | 155 |
| Effluent after mixing, flocculating and settling | 44 | 98 |
| Effluent after treatment 10.0 p.p.m. FeCl$_3$, 1.5 p.p.m. Guar A) | 8 | 70 |
| Test No. 3: | | |
| Raw Sewage | 291 | 250 |
| Effluent after mixing, flocculating and settling | 72 | 152 |
| Effluent after treatment 10.0 p.p.m. FeCl$_3$, 1.5 p.p.m. Guar A) | 12 | 115 |

Guar A=β-hydroxypropyl trimethyl quaternary ammonium chloride guar ether D.S.=0.2 (GOCH$_2$CHCH$_2$N+(CH$_3$)$_3$Cl- where G=Guar Group).
|
OH

EXAMPLE 2

In this example, a series of less exhaustive tests were run to determine the effectiveness of various reagents at various levels. In these experiments, 500 ml. samples of raw sewage containing 430 parts per million of suspended solids and BOD estimated at about 300 were treated according to a similar procedure in that the added reagents were mixed for a 2-minute period at 100 r.p.m. stirrer speed after which the stirrer was slowed down and continued to operate for 15 minutes at the slow speed. The stirrer was removed and the sewage allowed to settle for 10 minutes at which time the clarity of the supernatant was determined and the settling rate was also estimated. The results of these tests are given in the following table.

TABLE 2

| Reagents in p.p.m. | Test No. | | | | | | | | | |
|---|---|---|---|---|---|---|---|---|---|---|
| | 1 | 2 | 3 | 4 | 5 | 6 | 7 | 8 | 9 | 10 |
| FeCl₃ | | 10 | | 10 | | | 20 | | | |
| Al₂(SO₄)₃ | | | 10 | | 10 | | | 20 | | |
| FeSO₄ | | | | | | | | | | 20 |
| Fe₂(SO₄)₃ | | | | | | 10 | | | 20 | |
| Cationic Guar A | 1.5 | 1.5 | 1.5 | | | | 1.0 | 1.0 | 1.0 | 1.0 |
| Cationic Guar B | | | | 1.5 | 1.5 | 1.5 | | | | |
| Effluent Clarity | G | E | F-G | F-G | G | F | E | E | G | F |
| Effluent Settling Rate | 1 | 2 | 3 | 2 | 3 | 4 | 2 | 1 | 4 | 5 |

Clarity Code: G=Good, F=Fair, E=Excellent.
Settling Rates: 1=Best, 5 or more=Poor.
Cationic Guar A=Same as Example 1.
Cationic Guar B=β aminoethyl guar ether D.S. 0.08 (GOCH₂CH₂NH₂)

It will be seen from the above examples that the treatment is particularly effective for reducing suspended solids and the BOD. While specific compounds and concentrations have been illustrated, other compounds and concentrations can be used with similar effects. Likewise, the process is applicable to a variety of sewage and industrial wastes such as paper mill effluents, mine effluents and the like with generally similar results. It is to be understood therefore that the above description is illustrative and not limiting of the invention as defined in the following claims.

The embodiments of the invention in which an exclusive property or privilege is claimed are defined as follows:

1. A process for the treatment of waste effluents which comprises agitating the waste effluent with the combination of a polyvalent metal compound and a cationic derivative of a polygalactomannan gum, said derivative being an ether of a polygalactomannan gum and quaternary ammonium compound having the formula:

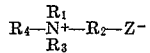

where Z is an anion, $R_1$, $R_2$ and $R_3$ are radicals containing not more than 18 carbon atoms selected from the group consisting of alkyl, substituted alkyl, alkene, cyclic groups formed by joining $R_1$ and $R_2$, aryl and alkyl; and when $R_1$, $R_2$ and $R_3$ are the same, each is a group containing not more than 3 carbon atoms, and when $R_3$ contains more than 3 carbon atoms, $R_1$ and $R_2$ are each an alkyl group not larger than ethyl and when $R_1$ and $R_2$ are joined to form a ring, $R_3$ is an alkyl group not larger than ethyl; and $R_4$ is selected from the group consisting of

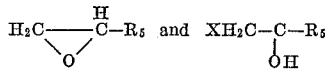

where $R_5$ is a divalent alkylene group having from 1 to 3 carbon atoms and X is a halogen atom, the derivative having a degree of substitution of about 0.05 to about 0.5, the polyvalent metal compound is employed in the range of about 5 to about 100 parts per million based on the weight of the waste effluent, and the cationic derivative is employed in the range of about 0.25 to about 10 parts per million based on the weight of the waste effluent.

2. Process according to claim 1 in which the polyvalent metal compound is ferric chloride.

3. Process according to claim 1 in which the polyvalent metal compound is alum.

4. Process according to claim 1 in which the polygalactomannan derivative is a quaternary ammonium derivative of guar gum.

5. Process according to claim 1 in which the quaternary ether group has the formula:

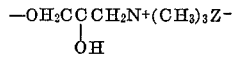

References Cited
UNITED STATES PATENTS

| | | | |
|---|---|---|---|
| 2,813,093 | 11/1957 | Caldwell et al. | 210—54 X |
| 2,975,124 | 3/1961 | Caldwell et al. | 210—54 |
| 3,017,294 | 1/1962 | Meisel | 162—175 X |
| 3,239,500 | 3/1966 | Keen et al. | 260—209 |
| 3,285,849 | 11/1966 | Watanabe et al. | 210—53 X |
| 3,350,304 | 10/1967 | Bacon | 210—52 |

SAMIH N. ZAHARNA, Primary Examiner

U.S. Cl. X.R.

210—53, 54

PO-1050
(5/69)

UNITED STATES PATENT OFFICE
CERTIFICATE OF CORRECTION

Patent No. 3,498,912          Dated March 3, 1970

Inventor(s) David L. Kieper and Stephen S. Treichel

It is certified that error appears in the above-identified patent and that said Letters Patent are hereby corrected as shown below:

Column 3, first formula thereof, before "$CH_3$", first occurrence, insert -- ( --.

Column 3, line 49, delete "chloroethyl" and insert in place thereof -- chlorethyl --.

Column 5, line 40, delete "alkyl" and insert in place thereof -- aralkyl --.

SIGNED AND
SEALED

JUL 14 1970

(SEAL)
Attest:

Edward M. Fletcher, Jr.
Attesting Officer

WILLIAM E. SCHUYLER, JR.
Commissioner of Patents